W. E. ACKERMANN.
EXPANDED METAL STRUCTURE.
APPLICATION FILED DEC. 31, 1919.

1,419,709.

Patented June 13, 1922.

INVENTOR:
WILLIAM E. ACKERMANN
By Geo. J. Haight
His ATTORNEY

UNITED STATES PATENT OFFICE.

WILLIAM E. ACKERMANN, OF PORTSMOUTH, OHIO.

EXPANDED METAL STRUCTURE.

1,419,709.

Specification of Letters Patent. Patented June 13, 1922.

Application filed December 31, 1919. Serial No. 348,599.

*To all whom it may concern:*

Be it known that I, WILLIAM E. ACKERMANN, a citizen of the United States, residing at Portsmouth, in the county of Scioto and State of Ohio, have invented a certain new and useful Improvement in Expanded Metal Structures, of which the following is a full, clear, concise, and exact description, reference being had to the accompanying drawings, forming a part of this specification.

This invention relates to improvements in expanded metal structure.

One object of the invention is to provide an expanded metal structure which is suitable for use as lath or reinforcement in concrete structures and wherein is obtained unusual strength against bending, per unit of weight.

Another object of the invention is to provide an expanded metal structure of the character indicated having some sections thereof in the form of an expanded mesh and other sections non-expanded, the expanded mesh sections being so arranged as to require a lesser quantity of the plastic material to unite the plastic material with the expanded metal structure, than heretofore required in articles of the same general class.

Still another object of the invention is to provide an expanded metal structure wherein the expanded mesh sections have the strands and bonds thereof so arranged as to effectively co-act with plastic material applied thereto in securing or "keying" the plastic material to the expanded metal structure and thereby prevent possibility of separation of the plastic material and expanded structure after setting of the plastic material.

Figure 1:
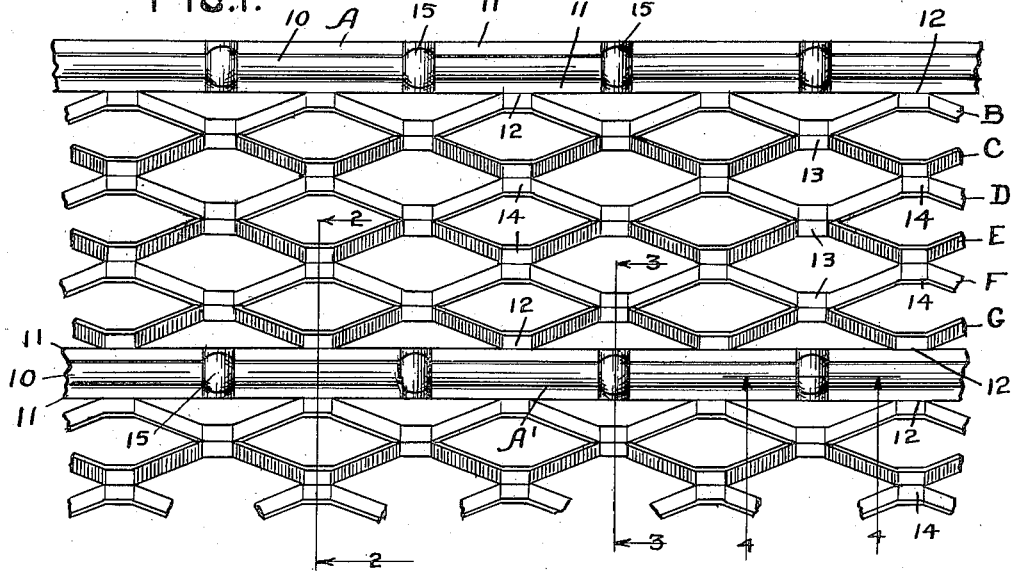
Figure 2:
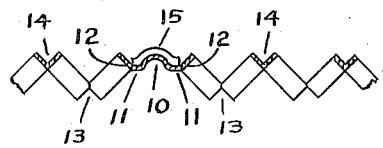
Figure 4:
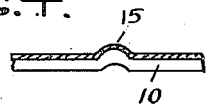
Figure 3:
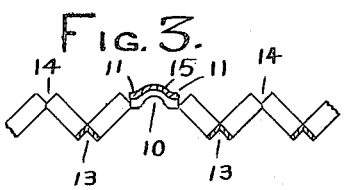

In the drawing forming a part of this specification, Figure 1 is a plan view of a portion of an expanded metal structure, such as a lath, embodying my invention. Figure 2 is a sectional view taken transversely of the sheet and corresponding substantially to the line 2—2 of Figure 1. Figure 3 is another sectional view similar to Figure 2 but taken on the line 3—3 of Figure 1. And Figure 4 is a detail sectional view taken on the line 4—4 of Figure 1.

In said drawing, the sheet from which the expanded metal structure is made, is assumed as having its greater length extending horizontally, as viewed in Figure 1, this assumption being made for convenience in describing the structure. As shown, the expanded metal structure comprises non-expanded sections of relatively wide longitudinally extending strands A and A' and relatively narrow longitudinally extending strands B, C, D, E, F and G.

The non-expanded section or wide strand A is shown as forming the edge of the sheet so that it acts as a border or selvage whereas the wide strand A' constitutes an intermediate strand of which there may be one or more in the sheet depending upon its width. Each of the wide longitudinally extending strands A—A', etc. is formed with a centrally disposed corrugation or rib 10, the same leaving two marginal portions 11—11 on each side thereof in the strands A—A', etc. By means of this construction of strands A—A', etc., relatively great strength per unit of weight is obtained against bending forces applied in a direction perpendicular to the general plane of the sheet. The wide strands A—A', etc., facilitate the nailing of the expanded metal structure in place "farther apart spacing" where the same is used as metal lath and permit of wider spacing of the studding and furring than is usal. When the strands A—A' are arranged horizontally, the longitudinally extending corrugations or ribs 10 will effectively serve to provide, in effect, horizontally extending tongue and groove connections between the plastic material and the lath so as to divide the plaster or other plastic material into panels and the plastic material be thereby better supported.

The strands B, C, D, etc., are disposed between the wide strands A—A', etc., and as will be understood by those skilled in the art, the number of strands B, C, D, etc., may be varied as desired. Those narrow strands adjacent the wider strands A—A',— as for instance the strands B and G, are united to the wide strands A—A' at longitudinally spaced intervals by bonds 12—12. Also, each adjacent pair of narrow strands B—C, C—D, D—E, etc., are united at longitudinally spaced intervals by other bonds 13—13 and 14—14. The bonds between the pairs of narrow strands B—C and C—D, etc., are alternately staggered as clearly indicated in Figure 1 so as to bring said bonds 13 and 14 at the four corners of a diamond-shaped opening or mesh. I have indicated the bonds 13 and 14 as arranged in series transversely of the sheet, the bonds 13 in one series alternating with the bonds 14 of the other series. Alternate narrow strands,— as for instance B, D and F, are inclined in substantially the same general direction transversely of the sheet and the intermediate series of narrow strands,—as for instance those referenced C, E, and G, are all inclined in the reverse general direction transversely of the sheet. With this arrangement of bonding and inclination of the narrow strands, it will be seen that the series of bonds 14 will provide troughs, as clearly shown, for instance, in Figure 2, whereas the other series of bonds 13 will provide ridges, as clearly indicated in Figure 3. In other words, the series of bonds, transversely of the sheet, are alternately ridge-like and trough-like so that the strength of the open mesh section of the structure is likewise increased and well adapted to resist strains perpendicularly to the general plane of the sheet. With the construction previously described it will be noted that, viewed from the top of the expanded metal structure as shown in Figure 1, all four strands of each diamond mesh in a series extending transversely of the sheet in a line with the section line 2—2, are upwardly convergingly inclined whereas the strands forming the four sides of each of the diamond meshes in a series extending transversely of the sheet in line with the section line 3—3 are, from the same viewpoint downwardly convergingly inclined. With this arrangement of the strands of the diamond meshes, I have found that less of the plastic material is required in order to form the proper overlapping connection or key between the plastic material and the lath since the peculiar diagonal positions of the various strands will cause the plaster or other plastic material to more quickly curl around the edges of the strands as the plaster or other plastic material is applied to the lath.

From an inspection of Figures 2 and 3, it will be seen that the non-expanded sections of the structure remain in the original plane of the sheet and also that the pairs of strands C—D; and E—F; etc., are bonded at the points 14—14 in the plane of the sheet. The strands of each of said pairs C—D; E—F; diverge both from each other and also from the plane of the sheet and a strand of one pair, as for instance the strand E, is bonded to a strand of the adjacent pair, as for instance the strand D, at points out of the plane of the sheet, the bonds out of the plane of the sheet being those referenced 13. This construction produces strands which may be said to be of "sinuous" form and the entire structure is one which, in effect, is relatively thick and readily adapts itself to be thoroughly embedded in the plaster or other plastic material.

In expanding or spreading the strands B—C, etc., into the open mesh formation, it is evident that effective overall length of said strands or of the entire sheet will be decreased or contracted and to compensate for this contraction, the non-expanded integrally united sections A—A', etc., are provided with corrugations 15 extending transversely thereof, said transversely extending corrugations 15 being located intermediate the bonds 12—12. The transverse ribs or corrugations 15 perform another function in that they increase the strength of the non-expanded sections A—A', etc., in resisting forces applied perpendicularly to the edges of the wide strands A—A' which might have a tendency to crush or collapse or double said strands A—A', etc.

I claim:

An expanded metal structure, comprising, longitudinally extending non-expanded, relatively wide strands provided with corrugations extending lengthwise thereof; and a series of longitudinally extending relatively narrow strands interposed between a pair of said non-expanded strands, said narrow strands each extending diagonally alternately from and toward said wide strands, the narrow strands nearest said wide strands being united thereto by longitudinally spaced bonds, adjacent pairs of narrow strands being bonded in staggered relation at points corresponding to the corners of diamond-shaped openings, the narrow strands defining the four sides of each diamond-shaped opening in alternate transversely extending series of such openings, being all convergingly inclined toward the same side of the sheet, said wide strands having longitudinally spaced transverse indentations therein effective to decrease the length thereof in accordance with the decrease in over-all length of said longitudinally extending strands due to the expansion thereof, laterally, into the diamond mesh, said transverse indentations occurring only intermediate the bonds between said wide strands and the adjacent narrow strands.

In witness that I claim the foregoing I have hereunto subscribed my name this 11 day of Dec. 1919.

WILLIAM E. ACKERMANN.

Witnesses:
HOWARD K. MOORE,
A. J. MCFARLAND.